(12) United States Patent
Yoshii et al.

(10) Patent No.: US 7,471,356 B2
(45) Date of Patent: Dec. 30, 2008

(54) REFLECTOR PROVIDING PARTICULARLY HIGH REFLECTANCE IN AN INTENDED VIEWING ANGLE AND REFLECTION TYPE LIQUID CRYSTAL DISPLAY DEVICE USING THE SAME

(75) Inventors: Katsumasa Yoshii, Fukushima-ken (JP); Tatsuya Moriike, Fukushima-ken (JP); Kenji Omote, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/895,773

(22) Filed: Jul. 21, 2004

(65) Prior Publication Data

US 2004/0257662 A1 Dec. 23, 2004

Related U.S. Application Data

(62) Division of application No. 10/668,878, filed on Sep. 23, 2003, now Pat. No. 7,123,324, which is a division of application No. 09/896,165, filed on Jun. 29, 2001, now Pat. No. 6,750,930.

(30) Foreign Application Priority Data

Jul. 3, 2000 (JP) .............................. 2000-201529
Jul. 3, 2000 (JP) .............................. 2000-201530

(51) Int. Cl.
*G02F 1/1335* (2006.01)
(52) U.S. Cl. ....................................... 349/114; 349/113
(58) Field of Classification Search ......... 349/113–114; 359/850, 688, 869
See application file for complete search history.

(56) References Cited

U.S. PATENT DOCUMENTS 4,106,859 A * 8/1978 Doriguzzi et al. ........... 349/113

(Continued)

FOREIGN PATENT DOCUMENTS

| JP | 200047199 | 2/2000 |
|----|-----------|--------|
| JP | 2000047199 | 2/2000 |
| JP | 2002090511 A | 3/2002 |

*Primary Examiner*—David C. Nelms
*Assistant Examiner*—Hoan C Nguyen
(74) *Attorney, Agent, or Firm*—Brinks Hofer Gilson & Lione

(57) ABSTRACT

The present invention provides a reflector having a light-diffusing property which suppresses inter-object reflection over a wide angle, and giving particularly high reflectance in an intended range of viewing angle; and to provide a reflection type liquid crystal display device using the same. The reflector includes a plurality of light-reflective concave portions. Each of the concave portions is formed so that an inclination angle (an angle between a plane tangential to a point on a concave surface and the surface of the base material) is maximum on a side portion of the curved surface, and so that the direction of the side portion having the maximum inclination angle is on a far side from a view point of an observer. Moreover, the reflector includes many concave portions formed on a reflector surface, an inner surface of each of the concave portions-including a peripheral curved surface and a bottom curved surface that are continuously connected to each other, the peripheral curved surface being a part of a first sphere having a first radius, the bottom curved surface being a part of a second sphere having a second radius different from the first radius, and the bottom curved surface being located within the peripheral curved surface, wherein the first radius is smaller than the second radius, and a normal line extending from a center of the first sphere to the reflector surface and a normal line extending from a center of the second aphere to the reflector surface are not collinear. Further, the reflection type liquid crystal display device is provided with the reflector.

6 Claims, 11 Drawing Sheets

U.S. PATENT DOCUMENTS

| | | |
|---|---|---|
| 4,456,336 A | 6/1984 | Chung et al. |
| 5,841,496 A * | 11/1998 | Itoh et al. .................. 349/113 |
| 6,130,736 A * | 10/2000 | Sasaki et al. ............... 349/122 |
| 6,199,992 B1 * | 3/2001 | Tanada ....................... 359/858 |
| 6,219,120 B1 * | 4/2001 | Sasaki et al. ............... 349/113 |
| 6,266,112 B1 * | 7/2001 | Mizobata et al. ........... 349/113 |
| 6,285,425 B1 * | 9/2001 | Akins et al. ................ 349/113 |
| 6,421,106 B1 * | 7/2002 | Takatsuka et al. .......... 349/113 |
| 6,692,137 B2 * | 2/2004 | Blanchard ................... 362/241 |
| 2003/0039035 A1 * | 2/2003 | Yoshikawa et al. ......... 359/619 |

* cited by examiner

US 7,471,356 B2

REFLECTOR PROVIDING PARTICULARLY HIGH REFLECTANCE IN AN INTENDED VIEWING ANGLE AND REFLECTION TYPE LIQUID CRYSTAL DISPLAY DEVICE USING THE SAME

This application is a divisional application of U.S. application Ser. No. 10/668,878 filed on Sep. 23, 2003, now U.S. Pat. No. 7,123,324 entitled "Reflector Providing Particularly High Reflectance in an Intended Viewing Angle and Reflection Type Liquid Crystal Display Device Using the Same", which in turn is a divisional application of U.S. application Ser. No. 09/896,165 filed on Jun. 29, 2001, now U.S. Pat. No. 6,750,930, entitled "Reflector Providing Particularly High Reflectance in an Intended Viewing Angle and Reflection Type Liquid Crystal Display Device Using the Same", which claims priority to Japanese Patent Applications 2000-201529 and 2000-201530 both of which were filed on Jul. 3, 2000, all of which are herein incorporated by reference in their entirety.

BACKGROUND OF THE INVENTION

1. Field of the Invention

The present invention relates to a reflector that can be suitably used for a reflection type liquid crystal display device that uses ambient light as a light source. More particularly, the present invention relates to a reflector providing desirable reflectance over a wide angle and a particularly high reflectance in an intended range of directions in which light is reflected, and a reflection type liquid crystal display device providing a wide viewing angle and suitable directionality so that a display surface appears bright within a typical range of viewing angle for a display device incorporated in certain devices such as a notebook personal computer.

2. Description of the Related Art

In recent years, a reflection type liquid crystal display device using ambient light as a light source is widely used as a display part of a handy personal computer and the like particularly because of its low power consumption A reflection type liquid crystal display device has a reflector which reflects incident light coming through the display surface side back to the display surface side so that the user can view a display that is produced according to the arrangement of liquid crystal molecules in a liquid crystal layer.

When a reflector having a flat surface is used for a reflection type liquid crystal display device, the reflector has high reflectance in a particular reflection angle corresponding to an incident angle. However, the range of reflection angle showing high reflectance is narrow, i.e., the viewing angle is narrow. To solve such a problem, there are several attempts so as to obtain good reflectance in wider range of direction, for example, by forming many concave portions or grooves each being a part of a sphere on a reflector surface, or by providing depressions and projections randomly.

FIG. 15 shows a reflector provided with many concave portions being a part of a sphere on a reflector surface. A reflector 71 shown in this figure is formed as follows. On a substrate 72 made of a glass or the like, a flat-plate resin base material 73 (a base material for a reflector) made of a photosensitive resin layer or the like is provided. On a surface of the base material 72, many concave portions 74 whose inner surfaces being a part of a sphere are formed continuously so as to over lap each other. A reflection film 75 made of a thin film of aluminum, silver or the like is deposited or printed on the concave portions 74.

The concave portions 74 are formed with random depth in a range of 0.1 µm to 3 µm and are arranged randomly with the pitch between adjacent concave portions ranging from 5 µm to 50 µm. An inner surface of each of the concave portions 74 is a curved surface which is a part of a single sphere.

The term "depth of a concave portion" as used herein means the distance from the reflector surface to the bottom of the concave portion, and the term "pitch of concave portions" as used herein means the distance between the center of a concave portion (which has a circular shape as viewed in a plan view) and the center of an adjacent concave portion.

The reflector 71 has a reflection property shown as β in a comparative example of FIG. 7 or FIG. 12. Each of FIG. 7 and FIG. 12 is a graph showing a reflection property when the incident angle is 30°, wherein the vertical axis is reflectance (reflection intensity), and the horizontal axis is the reflection angle. The term "incident angle" as used herein means an angle $\omega_0$ between incident light J and a normal line H extending to the surface of the reflector 71 as shown in FIG. 16. Likewise, the term "reflection angle" as used herein means an angle $\omega$ between the normal line H and reflection light K on a plane including the incident light J and the normal line H. As β shown in the comparative example of FIG. 7 or FIG. 12, the reflector 71 shows relatively good reflectance, which is in a range of $15° \leq \omega \leq 45°$ centered about the reflection angle 30°.

The conventional reflector 71 described above enables one to obtain relatively good reflectance over a relatively wide angle due to the concave portions. However, as β shown in the comparative example of FIG. 7 or FIG. 12, the relatively higher reflection intensity peaks at the reflection angles 15° and 45°, which appear symmetrical with the reflection angle 30° being an axis of symmetry.

Nevertheless, a display device incorporated in devices such as notebook personal computers, in which a display surface is inclined during its use, is generally viewed from near the direction normal to the display surface as shown in FIG. 17 even though it may vary depending on a degree of inclination of the display surface or a position of the light source. FIG. 17 shows a notebook personal computer having a main body 81 and a cover portion 82, illustrating a situation in which the computer is used. In FIG. 17, P represents a direction normal to a conventional display device 83, Q incident light, $\omega_0$ an incident angle (e.g., 30°), $R_1$ reflection light whose reflection angle $\omega$ is the same as the incident angle $\omega_0$, $R_2$ reflection light whose reflection angle $\omega$ is smaller than the incident angle $\omega_0$, and $R_3$ reflection light whose reflection angle $\omega$ is greater than the incident angle $\omega_0$.

As seen in FIG. 17, directions in which a user usually looks at the display device 83 are concentrated in a range of the direction of the reflection light $R_2$ near the normal line P as opposed to a range of the reflection light $R_3$ in which the user has to look up at the display device 83 from a lower direction making it more difficult to see it. Therefore, for convenience of the users, it is desirable to secure a wide viewing angle while enhancing reflectance in the direction in which the reflection angle is smaller than reflection light.

To the contrary, a display device on a horizontal surface such as a table-type game machine is generally looked at from a direction near parallel to the surface as shown in FIG. 18. FIG. 18 shows a display device 85 provided horizontally on a table 84, illustrating a situation in which the device is used. In FIG. 18, W represents a direction normal to the display device 85, S incident light, $\omega_0$ an incident angle (e.g., 30°), $T_1$ reflection light whose reflection angle $\omega$ is the same as the incident angle $\omega_0$, $T_2$ reflection light whose reflection angle $\omega$ is smaller than the incident angle $\omega_0$, and $T_3$ reflection light whose reflection angle $\omega$ is greater than the incident angle $\omega_0$.

As seen in FIG. 18, directions in which a user usually looks at the display device 85 are concentrated in a range of the direction of the reflection light $T_3$ whose reflection angle is greater than reflection light $T_1$. Meanwhile, the reflection light $T_2$ is in the range of the direction where a user has to look into the display device, thus making it awkward to see it Accordingly, for convenience of users, it is desirable to obtain a wide viewing angle and particularly high reflectance in a range of directions in which the reflection angle is greater than the incident angle.

SUMMARY OF THE INVENTION

The present invention has been achieved to solve above-described problems. It is therefore an object of present invention to provide a reflector having desirable reflectance over a wide angle, wherein the reflectance can be selectively enhanced in desirable directions such as the reflection angles smaller (including negative values) or greater than the incident angles; and a reflection type liquid crystal display device having a wide viewing angle by incorporating the reflector, and having suitable directionality corresponding to a normal viewing angle under a particular condition such as in cases where the display surface is used inclined, horizontally, or the like.

It is another object of the present invention to provide a reflector having light-diffusing property which suppresses inter-object reflection over a wide angle, and giving particularly high reflectance in an intended range of viewing angle; and to provide a reflection type liquid crystal display device using the same.

To solve above-described problems, the present invention provides a reflector, wherein a plurality of light-reflective concave portions are formed on a surface of a base material; and each of the concave portions is formed so that an inclination angle is maximum on a side portion of the concave surface. The term "inclination angle" as used herein means an absolute value of an angle between a plane tangential to a point on the concave surface and the surface of the base material.

The reflector includes a plurality of light-reflective concave portions formed on a surface of a base material. Each of the concave portions is formed in a curved surface (concave surface) so that incident light is basically reflected irregularly, thus having a light diffusing property which suppresses inter-object reflection over a wide viewing angle. Moreover, the concave portions are formed in a curved shape so that an inclination angle is maximum on one side of the concave surface. Accordingly, inclination of a inclined plane opposed to the side of the concave surface becomes relatively gentle, so that the light incident upon the concave portion is reflected so as to have higher luminous density in a direction opposite to the side portion having the maximum inclination angle. Therefore, when the side portion having the maximum inclination angle of each of the concave portions is aligned in one direction, an amount of reflection light can be changed depending upon a viewing angle within a viewing angle range (range of vision).

It is preferable that the concave surface of each of the concave portions has a single minimal point. The term "minimal point" as used herein means a point on a curved surface where an inclination angle is zero, i.e., the deepest point in the vicinity.

The concave portions may be formed in a shape in which, for example, two different spheres each having different curvature overlap. However, there will be two minimal points in this case, so that the reflection angle of light will not change continuously. Then, it may not be possible to obtain the reflection angle that changes smoothly. In order to change the reflection angle of the light smoothly, it is preferable that each of the concave portions has a single minimal point and is formed in non-spherical shape where the maximum inclination angle is inclined on one side.

The inclination angle (an absolute value) is changeable within a range of 2° to 80°. It is particularly preferable within a range of 4° to 35°.

Selection of the inclination angle is preferably changed according to an angle in which an observer views a display surface of a liquid crystal display device, and its range is preferably from 2° to 80°. When it becomes greater than 80°, the reflection angle on the side surface becomes excessive, so that a part of reflection light exceeds a rim of pixel of a reflection type liquid crystal display device, and therefore, the vision becomes dark. In a case where the inclination angle is less than 2°, the effect of biasing the viewing angle distribution of an amount of reflection light becomes insufficient, so that it may not be possible to obtain desirable brightness at a particular viewing angle. When applied to electronic appliances such as a desktop calculator or a portable computer in general, the inclination angle (an absolute value) is preferably within a range of 4° to 35° in view of observers' normal viewing angle toward the display surface of the liquid crystal display device.

The plurality of concave portions are preferably formed randomly with the depth thereof ranging from 0.1 μm to 3 μm.

When the depth is below 0.1 μm, a light scattering effect is insufficient. When the depth exceeds 3 μm, abase material becomes too thick in order to realize the depth for the concave portions, so that it would be disadvantageous for a manufactured product. By forming the plurality of the concave portions with random depth, generation of moiré pattern resulting from the interference of light can be prevented unlike when the plurality of concave portions are formed with uniform depth. Moreover, concentration of the reflection light amount at a particular viewing angle is diffused so that changes of the reflection light amount within the viewing angle become gradual.

The plurality of the concave portions are preferably arranged adjacently and randomly to each other.

If each of the concave portions is arranged apart from each other, an opening between each of the concave portions becomes a flat surface, thus increasing the flat surface reflection, and therefore, it would become harder to obtain sufficient diffuse reflection within a limited pixel range. Thus, it is preferable that each of the concave portions is arranged adjacent to each other. Moreover, if the concave portions were arranged regularly, the moiré pattern would generate. Therefore, it is preferable to arrange them randomly.

The plurality of the concave portions are preferably formed so that the side portion having the maximum inclination angle of the concave surface is aligned in a particular direction.

When the side portion having the maximum inclination angle of the concave surface of each of the concave portions is aligned in the particular direction, an amount of reflection light changes for a whole reflector depending upon the viewing angle. That is to say, in the reflector, an amount of reflection light is a viewing angle dependent. The base material surface appears brighter from a viewing angle for which the display device is designed to give a more reflectance than from other angle. Therefore, a reflection type liquid crystal display device appear to be brighter in an angle from which electronic appliances such as a desktop calculator, a portable computer, and the like are typically viewed.

Moreover, the present invention provides a reflection type liquid crystal display device in which any of the above-described reflectors is mounted. Particularly, the reflector, which preferably has the plurality of the concave portions formed thereon so that the side portion having the maximum inclination angle of the concave surface is aligned in a certain direction, is preferably placed so that the side portion having the maximum inclination angle of each of the concave surfaces is arranged to be a far side from the view point of an observer.

The reflection angle of the concave portions is the largest on the side portion having the maximum inclination angle. Therefore, if a direction of the maximum inclination angle of all of the concave portions is aligned to be a far side from the observer, an amount of reflection light is distributed higher in a direction near the viewpoint of the observer, thus realizing a liquid crystal display device having a bright display surface in a practical view point.

Moreover, in order to solve the above-described problems, the present invention provides a reflector including many concave portions formed on a reflector surface, an inner surface of each of the concave portions including a peripheral curved surface and a bottom curved surface that are continuously connected to each other, the peripheral curved surface being a part of a first sphere having a first radius, the bottom curved surface being a part of a second sphere having a second radius different from the first radius, and the bottom curved surface being located within the peripheral curved surface, wherein the first radius is smaller than the second radius, and a normal line extending from a center of the first sphere to the reflector surface and a normal line extending from a center of the second sphere to the reflector surface are not collinear.

By using the reflector, it is possible to obtain a sufficiently wide viewing angle because a wide range of inclination angle can be obtained due to small radius of the sphere forming the peripheral curved surface. Moreover, the bottom curved surface is a near-flat curved surface in a position slightly off the center of the concave portions, so that the distribution of a particular inclination angle becomes higher in the inner surface of the concave portions. As a result, reflectance becomes its utmost in a reflection angle greater or smaller than an incident angle, and the reflectance becomes higher in the vicinity and peaks at a direction of a such reflection angle.

In this case, the normal lines extending from the respective centers of the spheres to the reflector surface are preferably spaced apart from each other in a range of 0.1 μm to 10 μm. When the interval is less than 0.1 μm, suitable directionality cannot be obtained, and when more than 10 μm, reflection intensity of regular reflection becomes significantly small. The larger the spaced distance of each normal line, the greater a difference between the incident angle and the reflection angle whose reflectance is its highest.

Moreover, an inclination angle of the inner surface of each of the concave portions is desirably in a range of 10° to 35° and −35° to −10° for the peripheral curved surface, and in a range of 4° to 17° and −17° to −4° for the bottom curved surface. The reason is because if the inclination angle of the peripheral curved surface is out of the range of 10° to 35° and −35° to −10°, the inclination angle of the reflection light becomes too wide so that the reflection intensity decreases. Likewise, when the inclination angle of the bottom curved surface is out of the range of 4° to 17° and −17° to −4°, the reflectance in a particular direction does not become sufficiently high.

In addition, each of the concave portions is desirably formed randomly with depth in a range of 0.1 μm to 3 μm. In a case where the depth is less than 0.1 μm, regular reflection becomes too strong. In a case where the depth exceeds 3 μm, surfaces of convex portions cannot be filled with a smoothing film when concave portions are evened out in a later process, and it becomes impossible to obtain desirable reflection property. If the depth is set to a certain depth for all the concave portions, interference color of light would generate due to regularity, and a problem of coloring of the reflection light would occur.

The term "depth of the concave portions" as used herein means a distance between the reflector surface and a bottom of the concave portion. Likewise, the term "inclination angle of the inner surface of the concave portion" as used herein means an angle θ between horizontal plane and a slope that is defined in a 0.5 μm wide minute area at a position on the inner surface of the concave portion. The sign (positive/negative) of the angle θ is defined with respect to the normal line to the reflector surface. For example, an angle on the right of the normal line is considered positive, and an angle on the left of the normal line is considered negative.

Regarding the arrangement of each of the concave portions, they may be spaced apart from each other but are desirably formed so that they are continuously connected to each other. Accordingly, it is possible to arrange them effectively on a whole surface of the reflector surface, so that the effect of widening a viewing angle while maintaining suitable directionality by the concave portions can be maximized.

Another arrangement is that many concave portions are formed along with many grooves on the reflector surface. Accordingly, in addition to the effect by the concave portions described above, it is possible also to obtain an effect of widening the viewing angle in a direction perpendicular to the grooves by providing the grooves. In this case, the groove can be either straight or curved, and may be crossed each other at any angle. Moreover, the concave portions and the grooves are formed in the density in a range in which effects of each part will not be lost.

Moreover, the present invention provides a reflection type liquid crystal display device having the above-described reflector. The reflector may be either and external type reflector that is provided on the outside liquid crystal cell, or a built-in type reflector that is provided on the inner surface of the substrate of the liquid crystal cell.

The liquid crystal display device of the present invention is provided with a wide viewing angle and suitable directionality. Therefore, when it is incorporated in certain devices such as a notebook personal computer, a game machine and a cellular phone, it is possible to obtain sufficient brightness in the viewing angle which users typically views the device.

BRIEF DESCRIPTION OF THE DRAWINGS

FIGS. 9A and 9B show a concave portion 4 of the reflector in Embodiment 3 of the present invention, wherein FIG. 9A is a cross-sectional view thereof, and FIG. 9B is a plan view thereof;

DESCRIPTION OF THE PREFERRED EMBODIMENTS

The present invention will be described in details with reference to accompanying drawings, but it will be understood that it is not intended to limit the present invention to these preferred embodiments.

Embodiment 1

Figure 1:
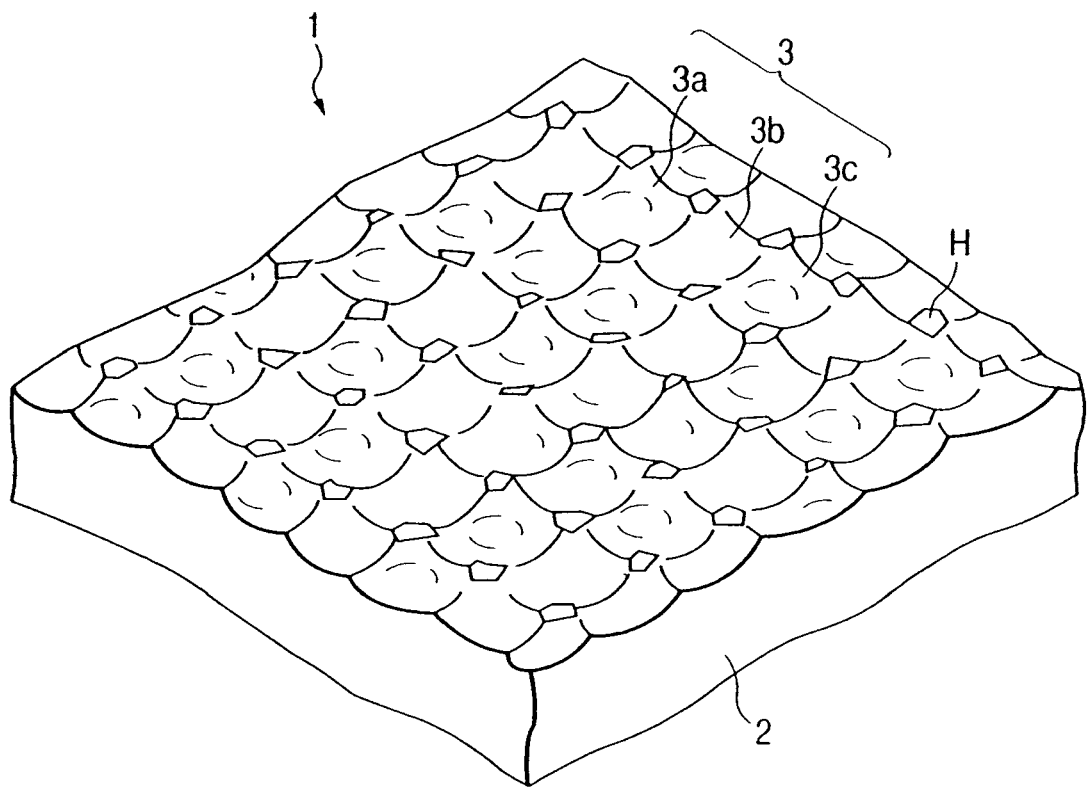
FIG. 1 is a perspective view illustrating a part of a reflector according to Embodiment 1 of the present invention.

FIG. 1 shows a reflector in Embodiment 1 of the present invention. As shown in FIG. 1, the reflector in Embodiment 1 is formed as follows: On a surface of a flat-type base material 2 (a reference level surface H) made, for example, of aluminum, many light-reflective concave portions 3a, 3b, 3c . . . (hereinafter also referred generically as 3) are formed so that they are randomly adjacent to each other.

Figure 2:
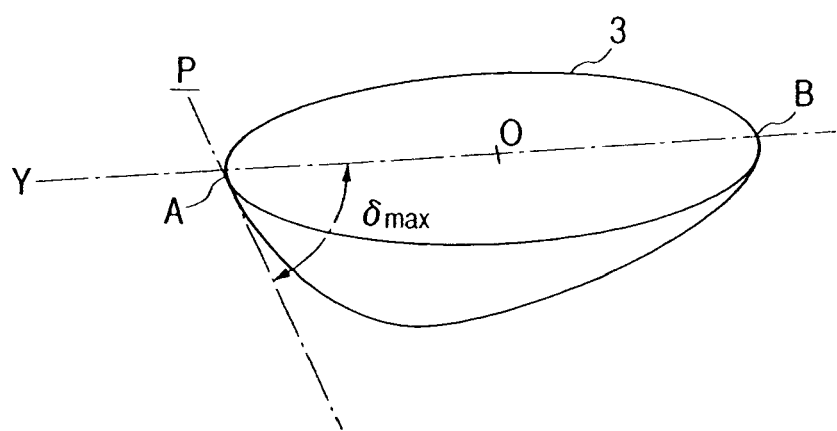
FIG. 2 is a perspective view illustrating one concave portion in Embodiment 1 of the present invention.
Figure 3:
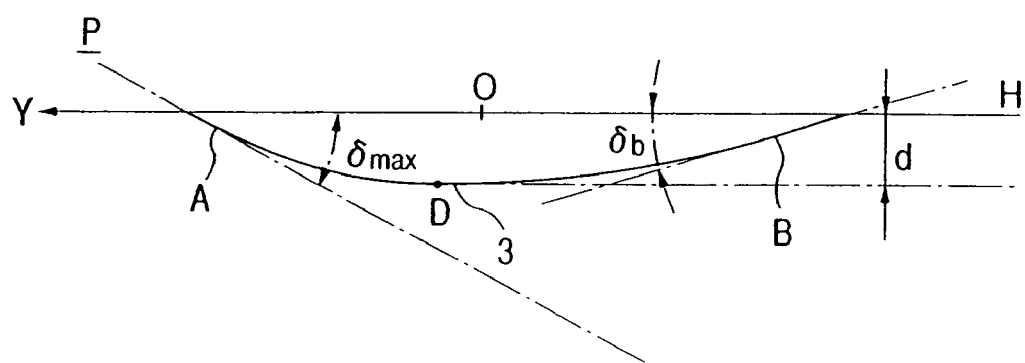
FIG. 3 is a cross-sectional view of the concave portion in Embodiment 1 of the present invention.

As shown in a perspective view of FIG. 2 and in a cross-sectional view of FIG. 3, these concave portions 3 have a concave surface that is in a circular shape as viewed in a plan view. The concave surface is in spoon-like non-spherical shape whose deepest point as shown in D in the FIG. 3 is shifted from a center O of the circular shape as viewed in a plan view toward one direction (Y direction) and is formed so that an inclination angle δ (an absolute value of an angle between a plane P tangential to a point on a curved surface and a base material surface H) is maximum on a side portion A, i.e., the maximum inclination angle δmax. Accordingly, in the concave surface, an inclination angle δb on a side portion B which is an opposite side of the side portion A with respect to the center O becomes smaller than the inclination angle (the maximum inclination angle δmax) on the side-portion A. In the reflector in Embodiment 1 of the present invention, the maximum inclination angle δmax of each of the concave portions 3a, 3b, 3c . . . varies randomly within a range of 2° to 80°. However, the most of the concave portions are formed randomly with the maximum inclination angle δmax thereof ranging from 4° to 35°.

Moreover, the concave surface of each of the concave portions 3 has a single minimal point D(a point on a curved surface where an inclination angle becomes zero). The distance between the minimal point D and the reference level surface H of the base material forms a depth d of the concave portion 3, and the concave portions 3a, 3b, 3c . . . are formed randomly with the depth d thereof ranging from 0.1 μm to 3 μm.

Figure 4:
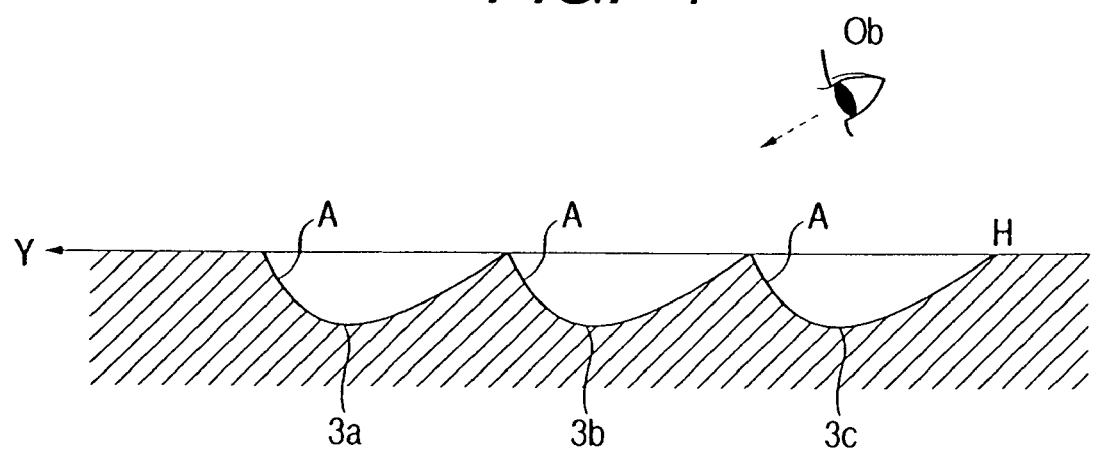
FIG. 4 is a cross-sectional view of a part of the reflector in Embodiment 1 of the present invention.

In Embodiment 1, as shown in FIG. 4, each of the concave portions 3a, 3b, 3c . . . are formed so that the side portion A having the maximum inclination angle δmax each of the concave surfaces is aligned in the direction Y which is on a far side from the view point Ob of the observer.

Figure 5:
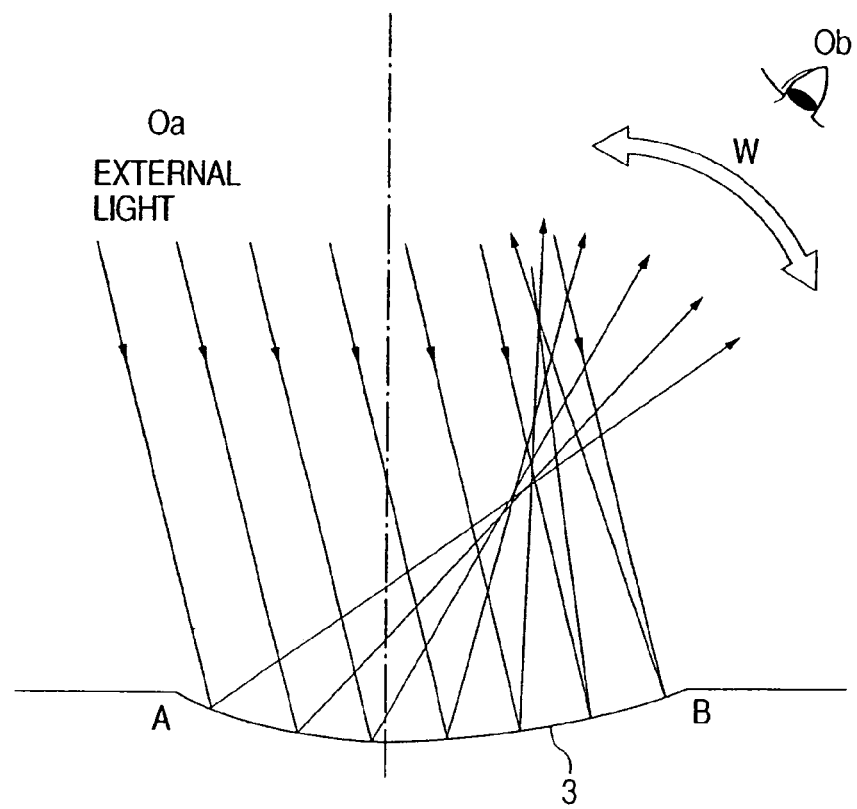
FIG. 5 is a cross-sectional view of the one concave portion in Embodiment 1 of the present invention.

In general, ambient light is incident upon the concave portions 3 from various directions and is reflected in various directions corresponding to an inclination angle of an incident point on the curved surface of the concave portions 3, so that reflection light is diffused over a wide angle. However, as shown in FIG. 5, when ambient light is incident from a direction Oa, for example, and a reflected direction is tracked, the reflection light tends to concentrate in an area W (bright-field range) as shown in FIG. 5 which is on an observer side, opposite to the side portion A having the maximum inclination angle δmax. Therefore, when the viewing point Ob of the observer is in a range of the bright-field area W, it appears brighter than observing from other directions. Extent of the bright-field range and direction thereof can be controlled by adjusting the alignment and a shape of the concave portions.

In the reflector in Embodiment 1 of the present invention, each of the concave portions is formed in non-spherical shape having a single minimal point. Therefore, a reflection angle of light changes smoothly so that reflection light does not produce glare in a particular viewing angle.

The maximum inclination angle δmax of each of the concave portions 3a, 3b, 3c . . . may be in a range of 2° to 80°, but mostly are formed in a range of 4° to 35°. Accordingly, light is incident upon whole surface of the concave portions and scattered in a wide area within a range that the reflection light is not wasted, and therefore, the viewing angle appears bright as a whole. It become particularly bright in the particular viewing angle because much of the light is reflected especially toward the particular viewing angle.

The concave portions are formed randomly with the depth thereof ranging from 0.1 μm to 3 μm, and each of the concave portions is placed adjacent to each other. Therefore, it does not generate a moiré pattern when incorporated in a reflection type liquid crystal display device. Moreover, concentration of an amount of reflection light in the particular viewing angle is eased, so that the amount of reflection light changes smoothly within a range of vision.

The reflector 1 in Embodiment 1 of the present invention may be formed as follows though not limited thereto.

First, a hollow punch (a prick punch tool) whose tip is in a shape of a convex surface transformed from a shape of the concave portion is prepared. The tip of the hollow punch is placed facing an aluminum base material, and while keeping a relative alignment direction constant with respect to the aluminum base material, the hollow punch is struck against all the given area of the aluminum base material with its striking stroke and an interval being changed randomly. The striking stroke is adjusted so that the depth of the concave portion is in the given range. The interval of each strike is adjusted so that the moiré pattern does not generate.

Embodiment 2

A reflection type liquid crystal display device provided with the reflector 1 in Embodiment 1 of the present invention will be described as Embodiment 2 of the present invention.

Figure 6:
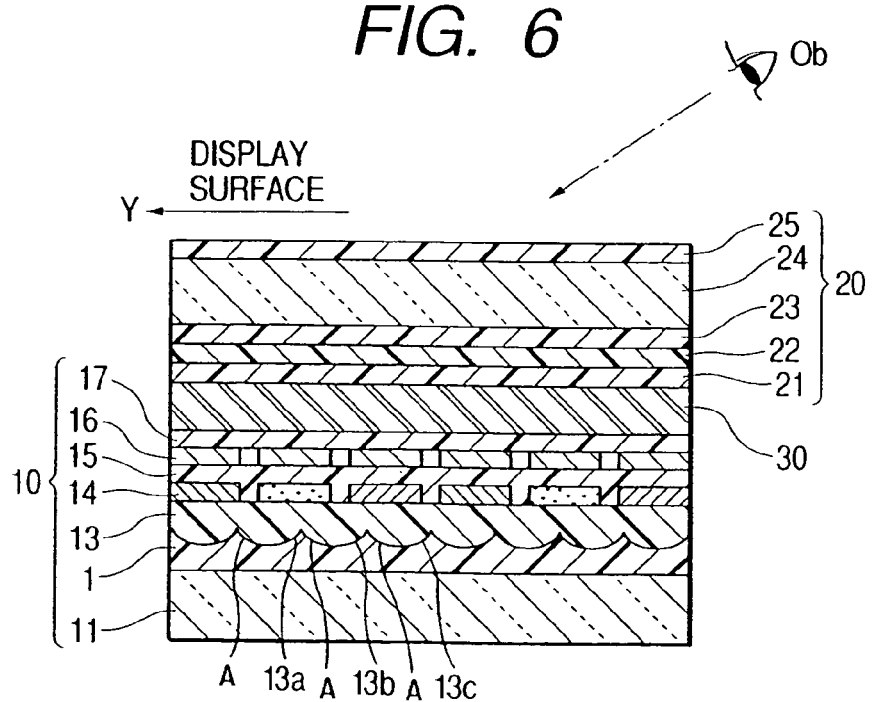
FIG. 6 is a cross-sectional view illustrating a layer composition of a reflection type liquid crystal display device in Embodiment 2 of the present invention.

FIG. 6 is a cross-sectional view illustrating a layer composition of the reflection type liquid crystal device in Embodiment 2 of the present invention.

With reference to FIG. 6, the reflection type liquid crystal display device includes a display-side transparent substrate 20, a reflection-side light-reflective substrate 10, and a liquid crystal layer 30 interposed therebetween. An outer surface of the display-side substrate 20 is a display surface, and the reflector 1 in Embodiment 1 of the present invention is incorporated in the reflection-side substrate 10.

The reflection-side substrate 10 is formed as follows. From the bottom, on a glass substrate 11, the reflector 1 in Embodiment 1 of the present invention, a transparent intervening layer 13, a color filter layer 14, a transparent planarization layer 15, a transparent electrode 16 formed of an ITO (Indium Tin Oxide) film, a nesa film or the like, and an alignment layer 17 are formed in that order. The display-side substrate 20 is formed on the opposite side of the reflection-side substrate 10, interposing the liquid crystal layer 30 therebetween. The display-side substrate 20 is formed as follows. From the liquid crystal layer 30 side, an alignment layer 21, an insulating layer 22, a transparent electrode 23 formed of an ITO film, a nesa-film or the like, a glass substrate 24, and an optical modulation layer (such as a polarizing plate, phase differential plate) 25 are laminated in that order.

In the reflection type liquid crystal display device, the reflector 1 is provided so that a direction of the side portions A having the maximum inclination angle of each of the concave portions 3a, 3b, 3c . . . is on far side (Y direction) from a view point Ob of the observer.

Moreover, the transparent electrodes 16 and 23 interposing the liquid crystal layer 30 therebetween are formed in stripe pattern on a surface which cross perpendicular to each other so as to form a simple matrix display device in which intersecting areas of the stripes are pixel thereof.

In the liquid crystal display device in Embodiment 2 of the present invention, when ambient light is incident upon the display surface, the incident light is transmitted through each of the transparent layers and reaches the surface of the reflector 1. The curved surface of the concave portions 3a, 3b, 3c . . . of the reflector 1 reflects the incident light over a wide angle. The reflected light is transmitted by each of the transparent layers again and goes out of the display surface. The emergent light is scattered over a wide viewing angle, so that it is possible to observe the display surface without interobject reflection of the light source from the wide viewing angle. The display has a maximum brightness when observed especially from a direction of the view point Ob opposite from the alignment direction Y.

Figure 7:
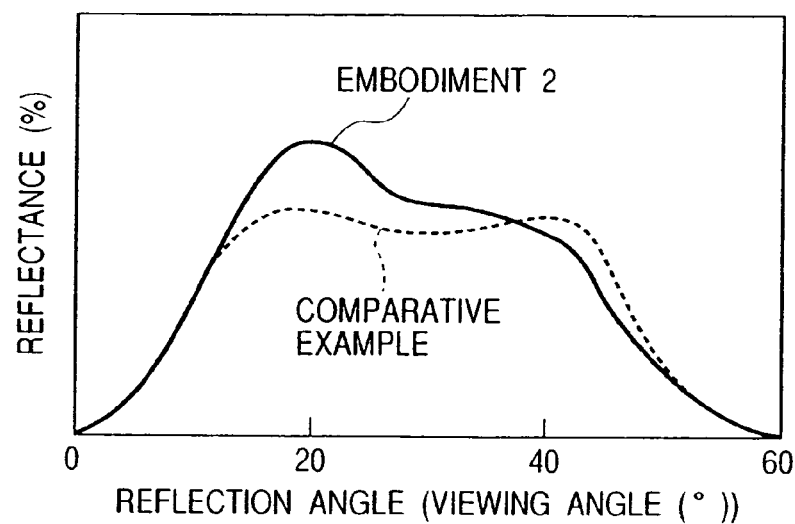
FIG. 7 is a graph showing the relationship between a viewing angle and reflectance.

FIG. 7 illustrates the relationship between brightness (reflectance) and viewing angle (θ°) when ambient light is illuminated at an incident angle of 30° on the display surface in Embodiment 2 of the present invention and shifting the view point Ob from perpendicular position (0°) to 60°. FIG. 7 also shows the relationship between a viewing angle and reflectance in a reflection type liquid crystal display device using a conventional reflector having a spherical shape concave portions as a comparative example.

As it is evident from FIG. 7, while the comparative example shows substantially the same reflectance in the viewing angle in a range from about 15° to about 45°, Embodiment 2 shows comparable reflectance with the comparative example in a range from about 15° to about 45°. The reflectance peaks in a region centered about the viewing angle of 20°. At the viewing angle of 20°, the reflectance of Embodiment 2 is higher than that of the comparative example by about 10%.

Accordingly, visibility becomes particularly good when the reflector 1 in Embodiment 1 of the present invention is incorporated in a reflection type liquid crystal display device such as a desk-top calculator and a portable computer which is observed from a direction that is inclined from the direction normal to the display plane toward the lower edge at the display panel.

In the reflector in Embodiment 1 of the present invention, a side portion having a maximum inclination angle of a concave portion is aligned toward an upper direction (Y direction) of a display surface so that the display surface appears particularly bright when observed from a direction that is inclined from the direction normal to the display plane toward the lower edge of the display surface. However, the alignment direction of the concave portions is not limited to this. For example, if the side portions having the maximum inclination angle of a plurality of concave portions are formed so that the side portions are suitably distributed to the left side and right side of a display surface, it is possible to obtain a reflection type crystal liquid crystal display device whose display surface appears particularly bright in a viewing angle zone of longitudinal direction including a front face of the display surface.

In the reflection type liquid crystal display device in Embodiment 2 of the present invention shown in FIG. 6, the reflector 1 has the transparent electrode 16 formed as a separate layer. However, if the transparent electrode 16 is formed from the reflector 1, and if the transparent electrode 16 is formed in a position of the reflector 1 shown in FIG. 6, the transparent electrode can be combined into the reflector, and therefore, the layer composition of the reflection type liquid crystal display device is simplified.

Moreover, if the reflector is made of semitransparent and semi-reflective base material such as a half mirror, for example, and an illumination plate is placed on the back of a liquid crystal panel, it is possible to obtain a semitransparent and semi-reflective liquid crystal display device which can be a reflection type when ambient light is bright and can be a transmitting type when the illumination plate is turned on as the ambient light becoming dark. This semitransparent and semi-reflective liquid crystal display device is included in the present invention.

A driving mode of a liquid crystal of the present invention is not limited, so that the active matrix mode using thin film transistors or a thin film diodes or the segment type other than the simple matrix mode described above is equally and suitably applicable. All these liquid crystal display devices are included in the present invention.

Embodiment 3

Figure 8:
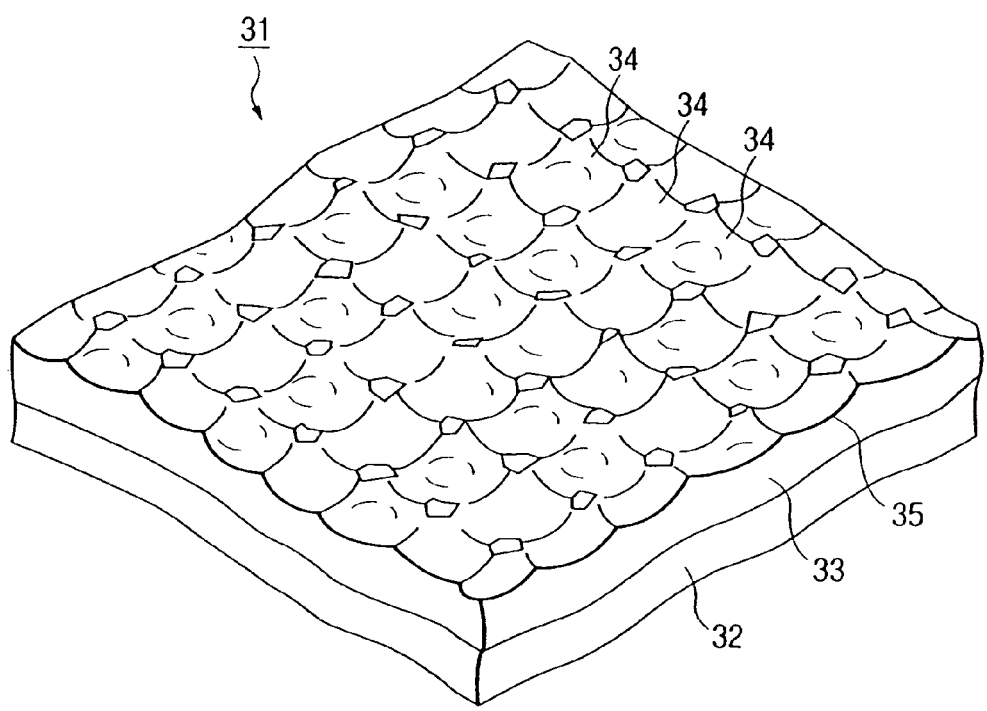
FIG. 8 is a perspective view of a reflector in Embodiment 3 of the present invention.
Figure 12:
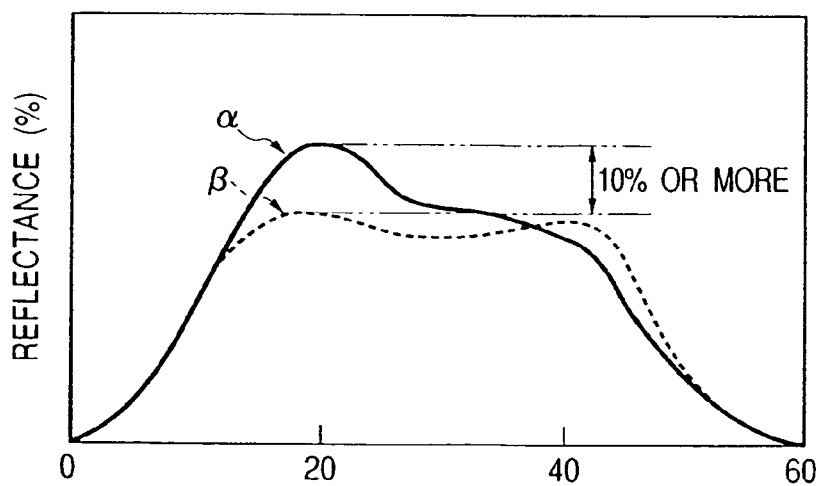
FIG. 12 is data illustrating a comparison between the reflection property of the reflector in Embodiment 3 of the present invention and that of a conventional reflector.

With reference to FIG. 8 and FIG. 12, Embodiment 3 of the present invention will be described. FIG. 8 shows a reflector in Embodiment 3 of the present invention. A reflector 31 in Embodiment 3 of the present invention is formed as follows as shown in FIG. 8. First, on a substrate 32 made of a glass or the like, a resin base material 33 (a base material for the reflector) in a shape of a flat plate made of a photosensitive resin layer or the like is provided. Then, many concave portions 34 whose inner surface has a shaped particularly, as shown in FIG. 9, are continuously formed so as to overlap with each other on a surface of the resin base material 33. Over the concave portions 34, a reflection film 35 made of a thin film of aluminum, silver or the like, for example, is formed by vapor deposition, printing or the like.

Figure 9A:
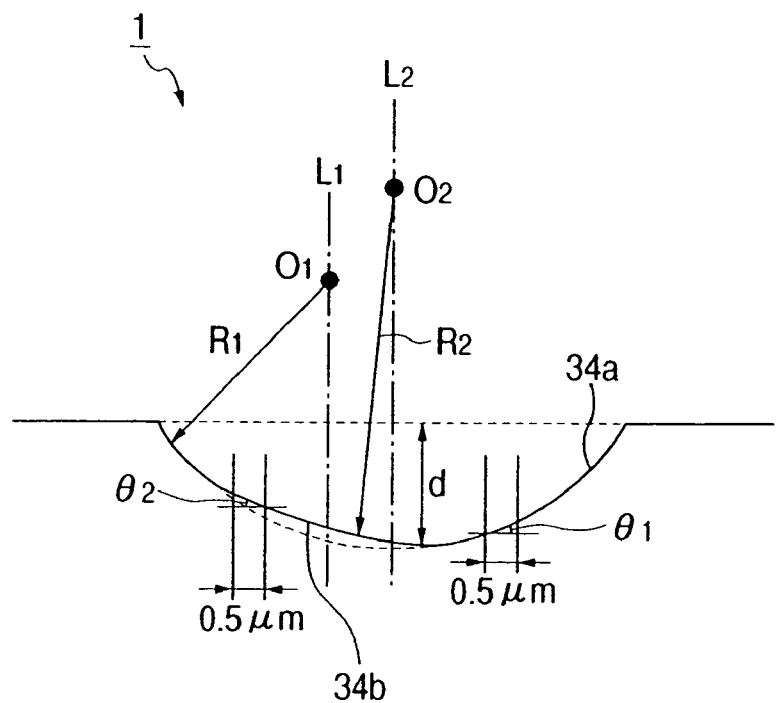
Figure 9B:
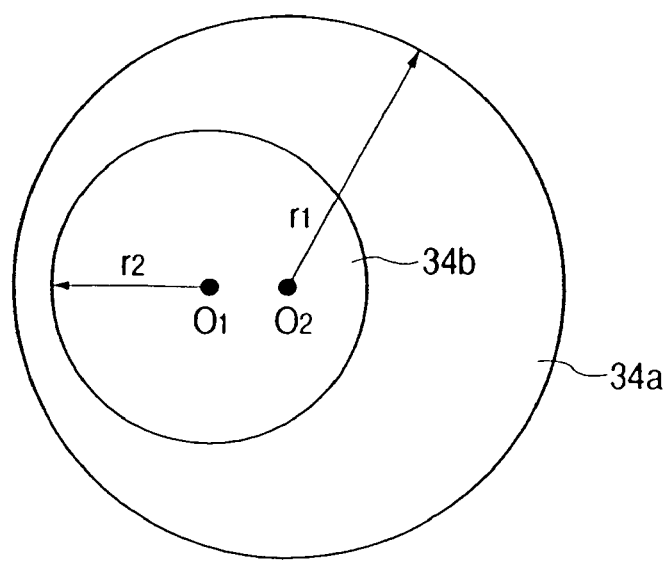

FIG. 9A is a cross-sectional view of the concave portion 34, and FIG. 9B is a plan view thereof. As shown in these figures, an inner surface of each of the concave portions 34 is formed by a peripheral curved surface 34a and a bottom curved surface 34b located within the peripheral curved surface 34a. The peripheral curved surface 3a is a part of a sphere having a radius $R_1$ with its center at $O_1$. The bottom curved surface 34b is a part of a sphere having a radius $R_2$ with its center at $O_2$. Normal lines extending from centers $O_1$ and $O_2$ of respective spheres to a surface of the reflector 31 are on different lines $L_1$ and $L_2$, respectively.

The relationship of two radiuses of two spheres, $R_1$ and $R_2$, respectively, is $R_1 < R_2$, and the radiuses thereof vary in the range of 10 $\mu m \leq R_1 \leq 70$ $\mu m$, and 20 $\mu m \leq R_2 \leq 100$ $\mu m$, respectively. In FIG. 9A, $\theta_1$ is an inclination angle of the peripheral curved surface 34a, and it varies in a range of $10° \leq \theta_1 \leq 35°$ and $-35° \leq \theta_1 \leq -10°$. Likewise, $\theta_2$ is an inclination angle of the peripheral curved surface 34b, and it varies in a range of $4° \leq \theta_2 \leq 17°$ and $-17° \leq \theta_2 \leq -4°$.

Note that a radius of $r_1$ of the peripheral curved surfaces 34a and a radius of $r_2$ of the bottom curved surface 34b, respectively, as viewed in a plan view change corresponding to radiuses $R_1$ and $R_2$, and the inclination angle $\theta_1$ and $\theta_2$.

The depth d of the concave potions 34 is provided randomly so that each of the concave portions has a different depth in a range of 0.1 $\mu m$ to 3 $\mu m$. If the depth of the concave portions 34 exceeds 3 $\mu m$, surfaces of convex portions cannot be filled with a smoothing film when concave portions 34 are evened out in a later process, and it becomes impossible to obtain desirable evenness. If the depth of the concave portions 34 is less than 0.1 $\mu m$, regular reflection becomes too strong.

Referring again to FIG. 8, alignment and the like of the concave portions 34 will be described. The concave portions 34 are aligned randomly with the pitch between adjacent concave portions ranging from 5 $\mu m$ to 50 $\mu m$. The reason for aligning as described above is because a problem like coloring of reflection light due to generation of interference color of light would occur if the adjacent concave portions 34 are aligned with the regular pitch. If the pitch between adjacent concave portions 34 is less than 5 $\mu m$, manufacturing of a mold for forming a reflector would be limited. In addition, the following problems and the like would occur: processing time becomes extremely long; it is not possible to form a shape in which a desirable reflection property can be obtained; the interference light generates and so on. Moreover, from a practical point of view, as a consideration of a case where a diamond indenter that may be used for manufacturing the mold is used, it is desirable to set the pitch in the range of 5 $\mu m$ to 50 $\mu m$ between adjacent concave portions 34.

Figure 10A:
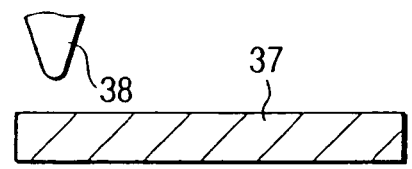
FIGS. 10A to 10F show cross-sectional views sequentially illustrating manufacturing steps of the reflector in Embodiment 3 of the present invention.
Figure 10B:
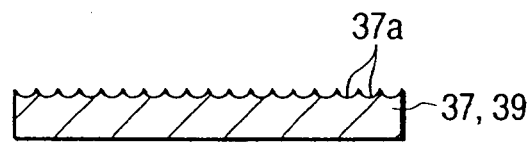

The reflector having the above-described composition can be formed as follows though not limited thereto. First, as shown in FIG. 10A, a mold base material 37 of a flat plate having a flat surface made of a brass, a stainless steel, a tool steel or the like, for example, is fixed on a table of a rolling device. Then, the surface of the mold base material 37 is pressed by a diamond indenter 38 whose tip is in the particular shape corresponding to the concave portions 34 shown in FIG. 9. The diamond indenter 38 is moved up and down and pressed against the mold base material 37 while the mold base material 37 is moved in a horizontal direction. By repeating this operation for a number of times, the plurality of concave portions 37a with different depths and different pitches are formed on the surface of the mold base material 37, thus obtaining a mold 39 for forming a reflector shown in FIG. 10B.

Figure 11:
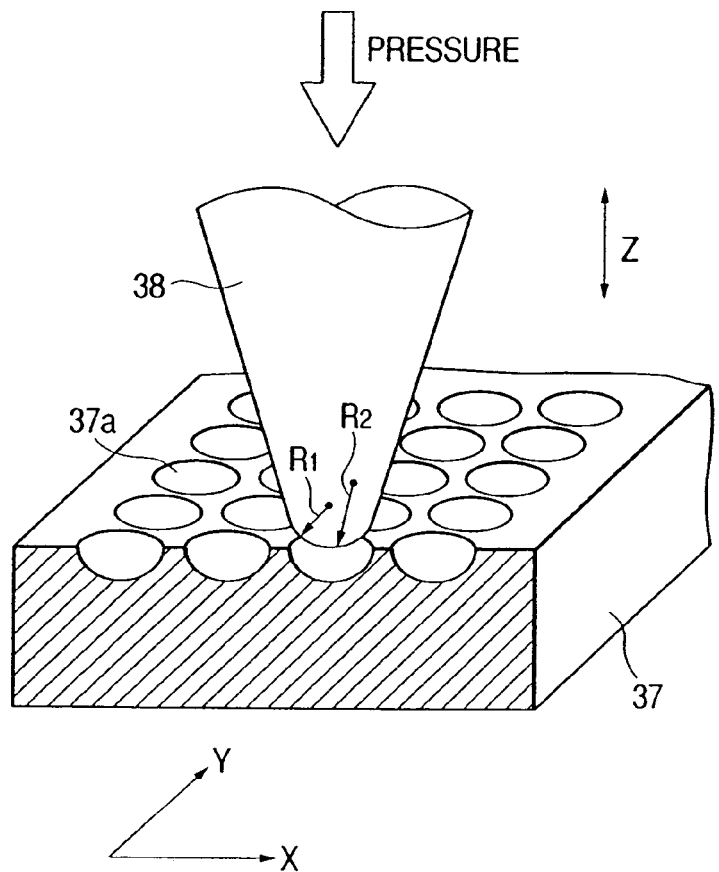
FIG. 11 is a diagram showing manufacturing steps of a mold used for forming the reflector in Embodiment 3 of the present invention illustrating a mold base material being indented by a diamond indenter.

As shown in FIG. 11, the rolling device used herein has functions of moving a table to fix the mold base material 37 in X direction and Y direction in the horizontal plane with the resolution of 0.1 $\mu m$, and of moving the diamond indenter 38 in vertical direction (Z direction) with the resolution of 1 $\mu m$. The pitch of the concave portions can be varied by changing the travel distance of the table in the X and Y directions, and the depth of the concave portions can be varied by changing the travel distance of the diamond indenter 38 in the Z direction. The tip of the diamond indenter 38 is formed so that a part of diameter $R_2$ is formed off from the central axis, and a part of diameter $R_1$ is formed slightly above the part of the diameter $R_2$.

Figure 10C:
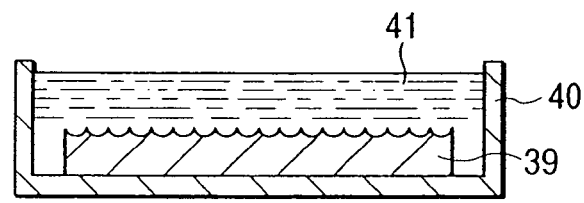
Figure 10D:
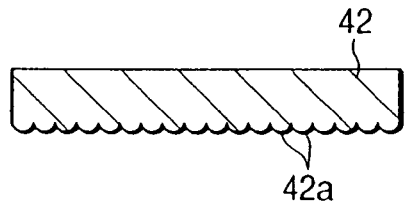

Thereafter, as shown in FIG. 10C, the mold 39 is placed in a box-type container 40, and a resin material 41 such as silicone, for example, is poured into the container 40. The container 40 is left at room temperature for cure. The cured resin product is taken out of the container 40 to cut off unnecessary portions. As shown in FIG. 10D, a transfer pattern 42 with a pattern surface 42a is formed wherein, the pattern surface 42a has many convex portions whose concave-convex formation is corresponding to the many concave portions of the pattern surface of the mold 39.

On a top surface of a glass substrate, photosensitive resin liquid such as acrylic resin, polystyrene resin, azide rubber resin and imide resin is applied by an application method such as spin-coating, screen-printing and spraying. After application of the photosensitive resin is completed, a photosensitive resin layer is formed as a resin base material 33 on the substrate by pre-baking the photosensitive resin liquid on the substrate for more than one minute at temperature in a range of 80° C. to 100° C., for example, using a heating device such as an oven and a hot plate. Note that the pre-baking condition is different depending on a kind of photosensitive resin used, and therefore, it may naturally be processed with a range of temperature and time other than those described above. A thickness of a photosensitive resin layer formed herein is preferably in a range of 2 $\mu m$ to 5 $\mu m$.

Figure 10E:
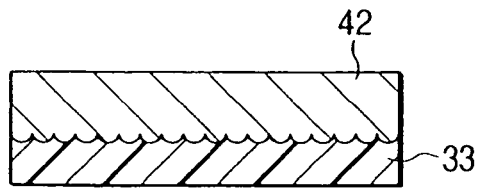
Figure 10F:
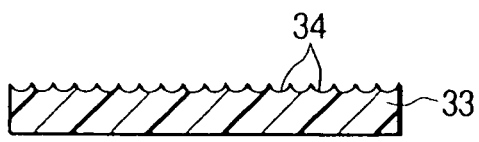

As shown in FIG. 10E, the transfer pattern 42 as shown in FIG. 10D is used. The pattern surface 42a of the transfer pattern 42 is pressed against the resin base material 33 on the glass substrate for a certain time period, after which the transfer pattern 42 is removed from the resin base material 33. In this way, many concave portions 34 are formed by transferring the convex portions of the transfer pattern surface 42a onto the surface of the resin base material 33 as shown in FIG. 10F. The value of the pressure used in the pressing process is preferably selected according to the type of the resin base material 33 used, and preferably in a range from 30 kg/cm² to about 50 kg/cm², for example. Pressing time therefore is also preferably selected according to the type of the resin base material 33 used, and the time may be set from about 30 seconds to about 10 minutes, for example.

A light beam such as ultraviolet light is radiated from a back surface side of a transparent glass substrate to cure the resin base material 33. An intensity of or greater than 50 mJ/cm² for the light-beam such as ultraviolet light radiated herein is enough in a case of using the resin base material 33 of the above-described kinds of the photosensitive resin layer. However, other radiation intensity may naturally be applied according to the type of photosensitive resin layer used. Then, the resin base material 33 on the glass substrate is post-baked for more than 1 minute at about 240° C., for example, by using the heating device such as the oven, the hotplate or the like similar to one used for pre-baking.

Lastly, on the surface of the resin base material 33, aluminum, for example, is deposited by electron-beam vacuum evaporation or the like along the surface of the concave portions to form a reflection film 31, thus, completing the reflector 31 in Embodiment 3 of the present invention.

FIG. 12 is a graph showing a reflection property curve α for the reflector 31 in Embodiment 3 of the present invention at the incident angle of 30° (light coming from a right hand side direction in FIG. 2) in which vertical axis is reflectance (reflection intensity) and horizontal axis is the reflection angle. As shown herein, with regard to the reflector 31 in Embodiment 3 of the present invention, the peripheral curved surface 34a formed of a part of a sphere with a smaller radius is located in the inner surface of the concave portions 34 and given a range of the inclination angle whose absolute value is relatively large. Therefore, reflectance -is desirable over such a wide angle as $15° \leq \omega \leq 45°$. Moreover, because the bottom curved surface 34b formed of a part of a sphere with a larger radius, that is to say, a near-flat curved surface is unevenly distributed, ratio of the inner surface giving a particular range of the inclination angle becomes high. As a result, the reflectance is high around and peaks at a reflection angle that is smaller than the reflection angle of 30°, which. is symmetrically opposite to the incident angle of 30°. At the reflection angle of 20°, the reflectance of the reflector 31 is higher than that of the conventional reflector 51 by about 10%.

Moreover, although not shown in a graph, in a case light incident from the left side direction in FIG. 9, the reflectance high around and peaks at a reflection angle that is larger than the reflection angle of 30°, which is symmetrically opposite the-incident angle in of 30°.

According to the above-described manufacturing method, when a mold 39 for forming the reflector is manufactured, the surface of the mold base material 37 is simply pressed against by moving the diamond indenter 38 up and down. Therefore, the diamond indenter 38 and the mold base material 37 are not rubbed against each other As a result, a surface condition of the tip of the diamond indenter 38 is transferred onto the mold 39 without failure. In other words, if the edge of the indenter 38 is mirror-finished, it is easily possible to make the inner surface of the concave portions of the mold 39 and the inner surface of the reflector mirror-finished.

In addition, as compared to a forming method of uneven surface by heating a resin film of polyester or the like, size of the depth of a concave portion, radius, pitch and the like, a surface appearance of an inner surface of the concave portion and the like, are all controlled, so that it is possible, by using a precision rolling device, to form a shape of the concave portion of the reflector as designed. Therefore, by following the method, it is easier to control the reflection property, such as a reflection angle and reflecting effect, of the reflector formed, and thus, obtaining a desirable reflector.

The rolling pattern of the concave portions shown in FIG. 10 as the above-described manufacturing method is only an example, and it may be designed differently accordingly. Moreover, materials for base materials for a reflector, a mold, and the like, and material composition for a transfer pattern may also be changed accordingly.

Embodiment 4

Figure 13:
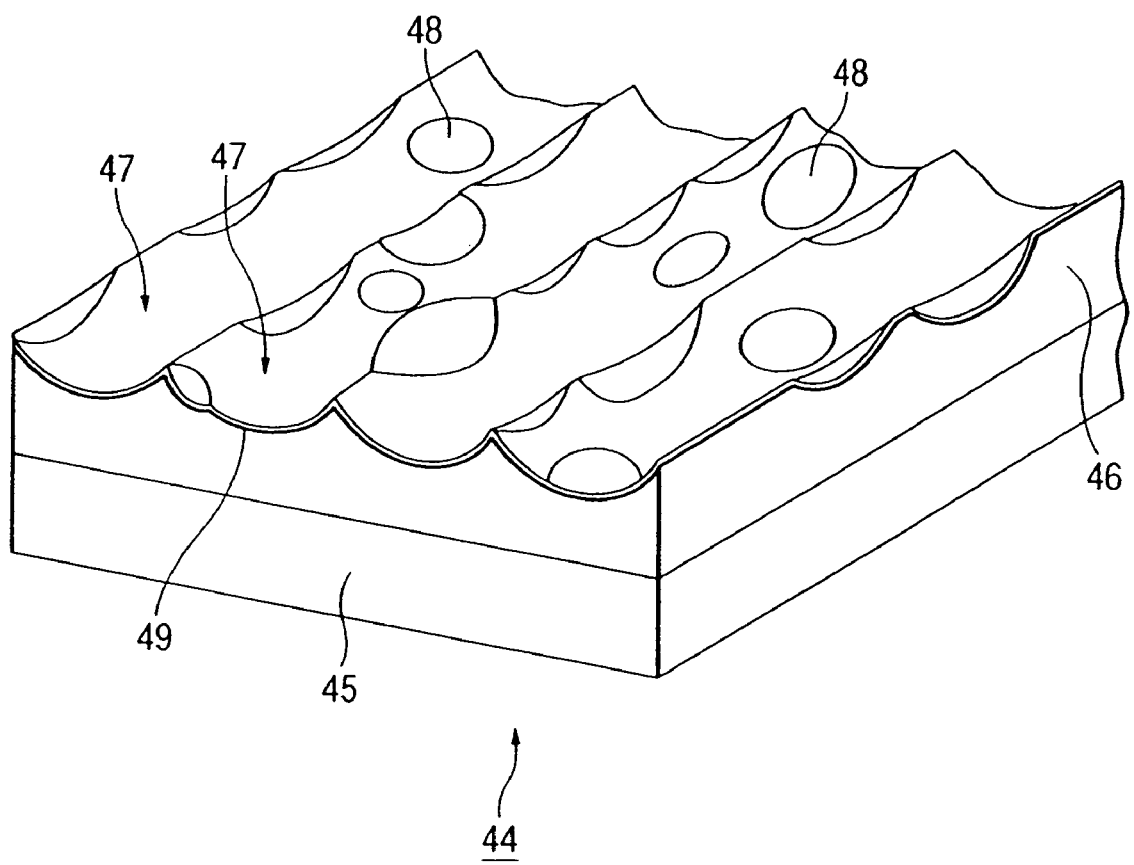
FIG. 13 is a perspective view of a reflector in Embodiment 4 of the present invention.

FIG. 13 shows a reflector in Embodiment 4 of the present invention. As shown in the figure, a reflector 44 in Embodiment 4 of the present invention is formed as follows. On a substrate 45 made of a glass, for example, a flat-plate resin base material 46 (a base material for the reflector) of a photosensitive resin layer or the like is provided. On the surface of the resin base material 46, stripe-shaped grooves 47 are formed, and many concave portions 48 in a particular shape are formed randomly thereon. A reflection film 49 of a thin film of aluminum, silver or the like, for example, is formed on the many concave portions 48 by vapor deposition, printing or the like, thus obtaining the reflector 44.

The concave portions 48 herein are the same as the concave portions 34 shown in FIG. 9. Therefore, an inner surface of the concave portions 48 includes a peripheral curved surface being a part of a sphere, and a bottom curved surface located within the peripheral curved surface. Various conditions such as the relationship between the radius of the peripheral curved surface and the radius of the bottom curved surface, the locations of the normal lines extending from the center of each of two spheres to a surface of the reflector 44 being different from each other, are also the same as those of the concave portions 34 described above.

According to Embodiment 4 of the present invention, in addition to the above-described effect of widening the viewing angle of the concave portions and providing suitable directionality, the effect of widening the viewing angle in the direction perpendicular to the grooves can be obtained by providing grooves.

Embodiment 5

A reflection type liquid display device provided with the above-described reflector will be described as Embodiment 5 of the present invention.

Figure 14:
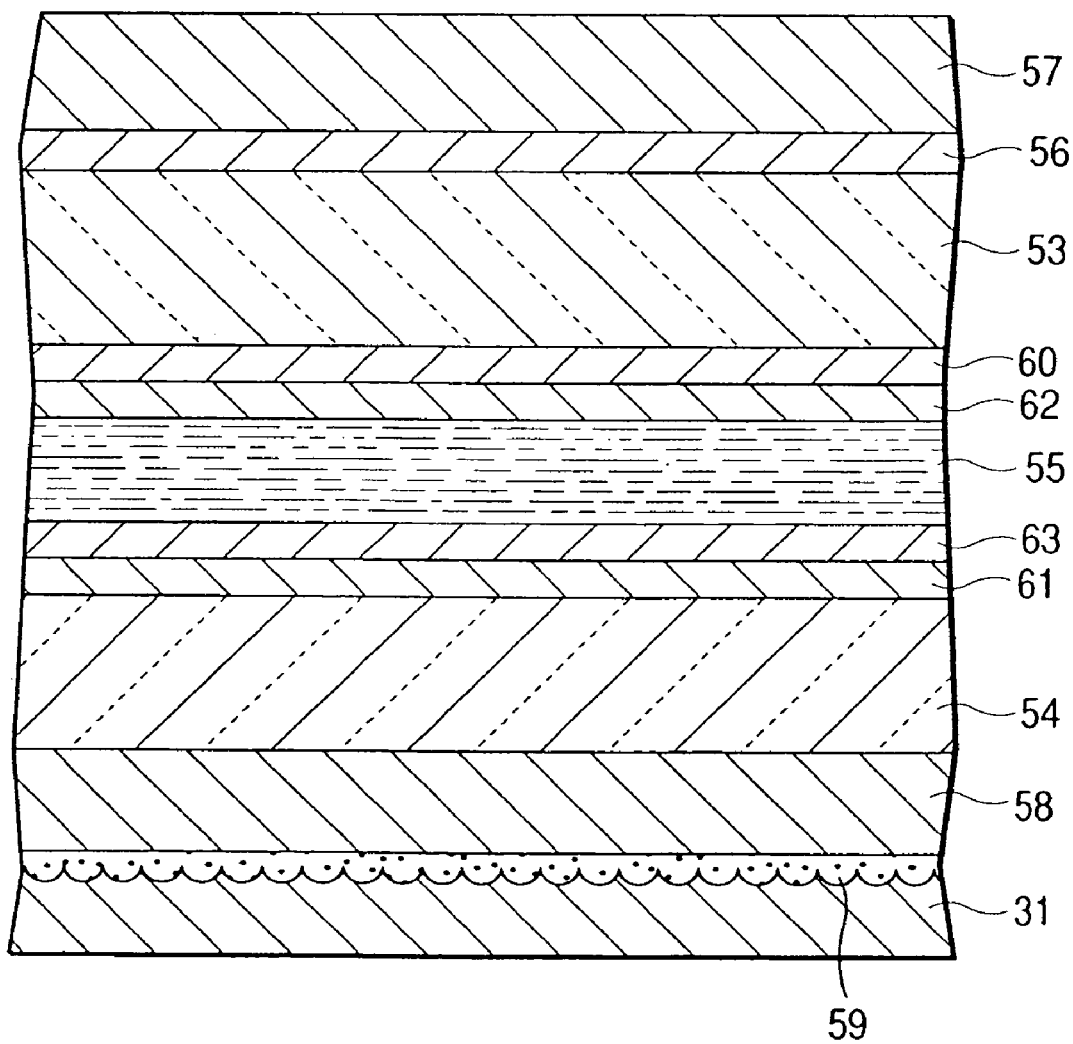
FIG. 14 is a cross-sectional view of a reflection type liquid crystal display device in Embodiment 5 of the present invention.
Figure 15:
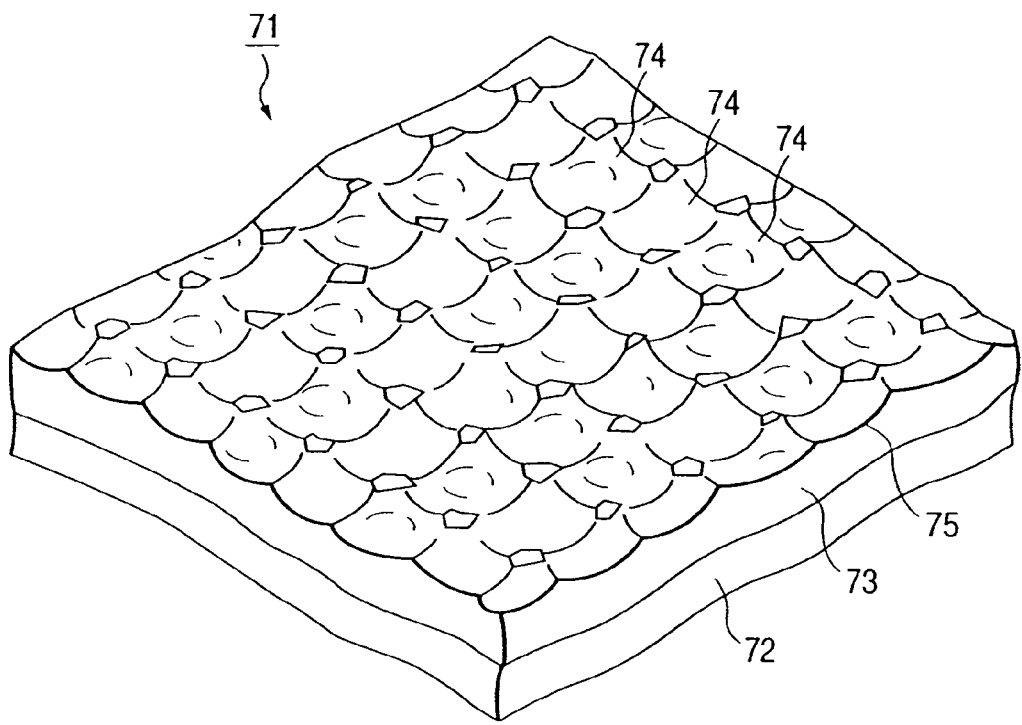
FIG. 15 is a perspective view showing an example of a conventional reflector.
Figure 16:
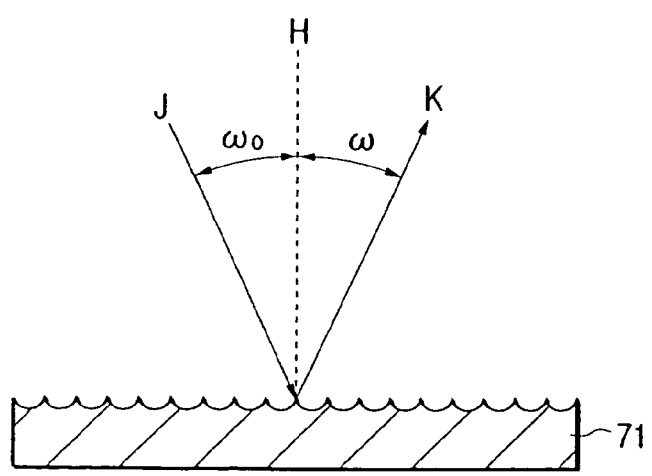
FIG. 16 is a diagram illustrating an incident angle and a reflection angle.
Figure 17:
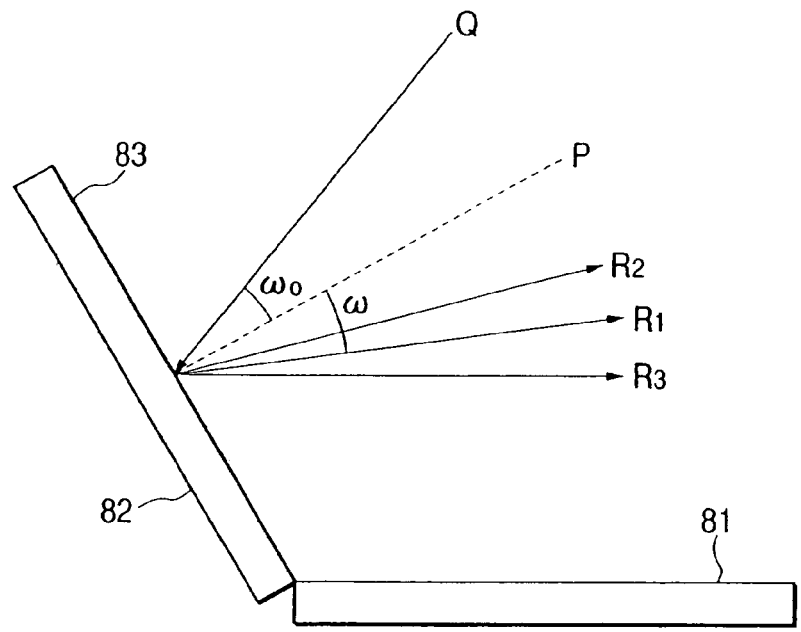
FIG. 17 is a diagram illustrating a using condition of a display device provided to a notebook personal computer.
Figure 18:
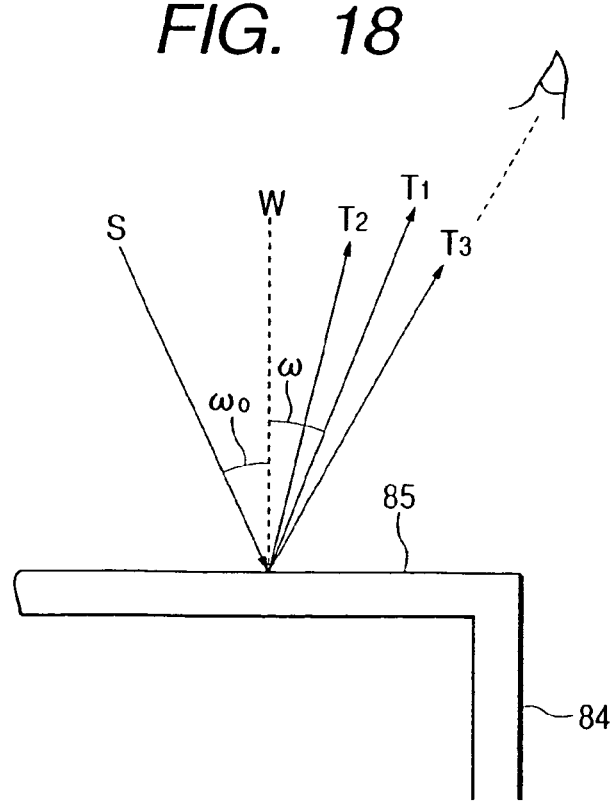
FIG. 18 is a diagram to explain a using condition of a display device provided horizontally.

As shown in FIG. 14, the reflection type liquid crystal display device includes a pair of substrate, a display side glass substrate 53 and a back-side glass substrate 54 with a thickness of 0.7 mm, for example, and a liquid crystal layer 55 interposed therebetween. A phase plate 56 made of polycarbonate resin, polyarylate resin or the like is provided on a top surface of the display side glass substrate 53. A first polarizing plate 57 is provided on a top surface side of the phase plate 56. On a lower side of the back-side glass substrate 54, a second polarizing plate 58 and the reflector 31 according to a preferred embodiment of the present invention shown in FIG. 14 are provided in that order.

The reflector 31 is placed so that the surface with the concave portions 34 being formed faces the lower side of the second polarizing plate 58. Between the second polarizing plate 58 and the reflector 31, an adhesive body 59 made of a material such as glycerin that does not have an adverse effect on the light refraction is filled.

On the surfaces of the both glass substrates 53 and 54 facing toward each other, transparent electrode layers 60 and 61 made of ITO (indium tin oxide) or the like are formed respectively, and on the transparent electrode layers 60 and 61, alignment films 62 and 63 made of polyimide resin or the like are provided respectively. Because of these alignment films 62 and 63, liquid crystal in the liquid crystal layer 55 is twisted by 240°.

Moreover, the liquid crystal display device may be a color display by forming a color filter (not shown) between the back-side glass substrate 54 and the transparent electrode layer 61 by printing or the like.

In the liquid crystal display device in Embodiment 5, the reflector 31 itself is provided with reflectance over wide reflection angle and suitable directionality, a display surface appears particularly bright over a wide angle centered about the direction which a user normally views the display surface.

In the reflection type liquid crystal display device in Embodiment 5 of the present invention, the reflector provided on the outer side of the second polarizing plate, i.e. the external-type reflector, is used as an example, but it may be provided on the opposing surface of the back-side glass substrate as in Embodiment 2 of the present invention to have a built-in type reflector. Moreover, although the STN (Super Twisted Nematic) liquid crystal display device is used as an example for applying the reflector according to the present invention, it should be naturally understood that it is also applicable to a TN (Twisted Nematic) liquid crystal display device whose liquid crystal molecules in a liquid crystal layer are twisted by 90°.

The reflector of the present invention is formed so that a plurality of concave portions have a different inclination angle between one side and the other side of a concave surface. It is therefore possible to obtain the light diffusing property which diffuses incident light and suppresses inter-object reflection over a wide angle, and to change an amount of reflection light depending on an viewing angle within a visual field.

The liquid crystal display device of the present invention provided with the reflector of the present invention suppresses the inter-object reflection over a wide angle and improves a level of visibility which is particularly high when the display surface is observed from a particular viewing angle.

What is claimed is:

1. A reflector, comprising:
   a base material having a semi-reflective surface; and
   a plurality of concave portions, said concave portions formed on a surface of said base material,
   wherein each of the plurality of concave portions comprises at least two radii of curvature whose centers of curvature lie on non collinear lines, each said lines being orthogonal to a plane of the base material, the plurality of concave portions comprising a first inner surface that is part of a first curved sphere having a first radius and a second inner surface that is part of a second curved sphere having a second radius different from the first radius.

2. A reflector as recited in claim 1, wherein an intensity of incident light reflected from the concave portions is preferentially increased in at least one desired angular direction.

3. A reflector as recited in claim 1, wherein each concave portion is formed so that a maximal inclination angle is present on a side portion of the concave surface and wherein the direction of the maximal inclination angle in each of the concave portions is aligned to be a far side from the view point of an observer.

4. A reflector as recited in claim 1, wherein the first inner surface is a peripheral curved surface and the second inner surface is a bottom curved surface connected to the peripheral surface, wherein the first radius is smaller than the second radius.

5. A reflector as recited in claim 1, wherein an illumination plate is placed on the back of a liquid crystal panel.

6. A reflector as recited in claim 1, wherein each of the plurality of concave portions is formed as a combination of at least two spheres and each two concave portions of the plurality of concave portions that are adjacent to each other have respective depths and pitches that differ from each other.

* * * * *